July 10, 1951 T. C. SHARP 2,560,485
SYNCHRONIZED MOTOR DRIVE
Filed May 19, 1949
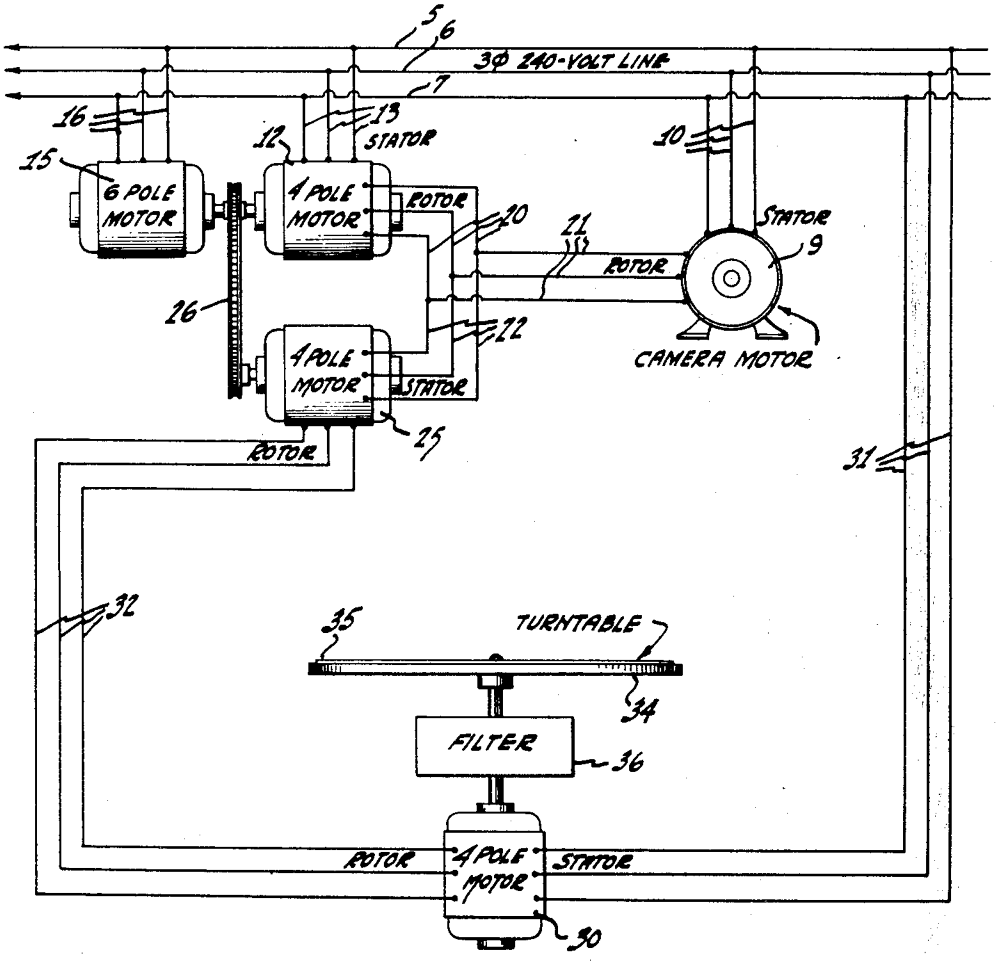
INVENTOR.
THOMAS C. SHARP
BY
Carl R. Goshaw Patented July 10, 1951 2,560,485

UNITED STATES PATENT OFFICE 2,560,485

SYNCHRONIZED MOTOR DRIVE

Thomas C. Sharp, North Hollywood, Calif., assignor to Radio Corporation of America, a corporation of Delaware Application May 19, 1949, Serial No. 94,207

6 Claims. (Cl. 318—78)

This invention relates to motor drive systems, such as are used in motion picture production, and particularly relates to a system whereby the speed of rotation of one element rotating at a certain speed may be synchronized with the speed of rotation of another element rotating at a different speed.

In the art of motion picture production, a self-synchronous type of motor drive system is employed in many instances, whereby the rotors of a plurality of motors driving cameras and sound recorders, sound reproducers, and the like are interconnected, the stators being energized from the same power source, and the rotor of the distributor motor being driven by another motor at a certain constant speed, which determines the speed of rotation of the other rotors.

In many instances, a scene is photographed during the reproduction of a sound record, such as a disc phonograph record, in which the actors are guided by their previous recording of the sound to accompany the particular scene in which they are acting. Since the sound is to be later combined with the picture, proper synchronism between the reproduced sound record and the picture speed is necessary. This requires that the motor driving the reproduced record be run in step with the motor driving the film. In many instances, the phonograph record may be located a considerable distance from the cameras, and thus, the synchronism must be maintained electrically rather than mechanically. Also, in the case of the reproduction of pre-scored disc records, it is desirable that the turntable be rotatable at two speeds, such as at 33⅓ and at 78.26 revolutions per minute, while still maintaining synchronism between the reproduced sound and the advancement of the picture film.

The present invention, therefore, is directed to a system whereby it is possible to vary the speed of the turntable at a distant point by variations in gear ratios at the distributor point, while obtaining a uniform speed of rotation of the turntable at the selected speed. In brief, this is accomplished by gearing together, in the desired ratio, the rotor of a first distributor motor and the rotor of a second distributor motor having its stator energized from the rotor of the first distributor motor. Simply by varying the gear ratio between these two rotors, any particular speed may be obtained for the turntable, which will be in synchronism with the speed of another motor. Although a filter may be interposed between the turntable driving motor and the turntable, the turntable may be driven directly without a filter, and, due to the inertia of the fast rotating equipment and the small amount of difference in potential between the rotor and stator of the turntable motor, a particularly uniform speed of rotation of the turntable is obtainable.

The principal object of the invention, therefore, is to facilitate the synchronous rotation of a plurality of moving elements at different speeds.

Another object of the invention is to provide an improved self-synchronous motor drive system, wherein the speed of one of the driven elements may be driven at different speeds in synchronism with the other elements.

A further object of the invention is to provide an improved method of and system for synchronously driving a camera motor and a disc phonograph turntable.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single figure shows, diagrammatically, a camera motor and phonograph turntable motor being connected in accordance with the invention.

Referring now to the drawing, a standard three-phase, 240-volt line, shown by conductors 5, 6, and 7, or other suitable three-phase power source, is connected to the stator of a camera motor 9 over conductors 10. Also connected to the line conductors 5, 6, and 7, is the stator of a first distributor motor 12 over conductors 13 and a synchronous motor 15 over conductors 16.

The rotor of four-pole distributor motor 12 is connected over conductors 20 and 21 to the rotor of the camera motor 9 and over conductors 20 and 22 to the stator of a second four-pole distributor motor 25, this latter motor being similar to the distributor motor 12. By means of a chain 26 and associated sprockets on the rotor shafts of motors 12 and 25, the two rotors are geared together, to rotate together at respective speeds determined by the ratio of the chain gears.

Also connected to the line conductors 5, 6, and 7, is the stator of a turntable motor 30 over conductors 31, the rotor of the turntable motor 30 being connected to the rotor of motor 25 over conductors 32. Interposed between the rotor of the motor 30 and the turntable 34, shown having a disc record 35 thereon, is a mechanical filter 36, although it is to be understood that the filter 36 is not necessary, but would provide additional filtering when the turntable is driven at low speeds. Although only one turntable motor 30 and one camera motor 9 have been illustrated, it is to be understood that other camera motors or other sound recorder motors may be connected in the system by connecting their stators to the line, and if their speed of rotation is the same as motor 9, the rotors would be connected to conductors 20 and 21, and if the speed should be the same as that of the turntable, the rotors would be connected to the conductors 32.

Assuming that there is a sixty-cycle frequency in the line conductors 5, 6, and 7 and that the motors have the number of poles indicated, if it is desired to drive the turntable 34 at 78.26 revolutions per minute, then the gear ratio between the rotor of motor 12 and the rotor of motor 25 should be 1200 to 1121.70, while, if the turntable is to be rotated at 33⅓ revolutions per minute, the ratio between the gears should be 1200 to 1166.67. Under this assumption, the interlock frequency in the conductors 21 will be twenty cycles when the motor 15 is running at 1200 revolutions per minute, and the interlock frequency in conductors 32 will be 58.889 cycles to rotate the turntable 34 at 33⅓. To rotate the turntable at 78.26, the interlock frequency in conductors 32 will be 57.492 cycles.

Thus, the speed of the turntable 34, located at a distance, may be quickly changed from one speed to another simply by changing the speed ratios between the rotors of the two distributor motors, while maintaining accurate synchronism between the turntable and other motors connected into the same system, as shown by motor 9. The interlock frequency between the rotors is sufficiently high to provide stability of operation. If a third synchronous speed is de-desired simultaneously with the other speeds, a third mechanically interconnected distributor motor could be provided having its stator electrically connected to the rotor of the first distributor motor.

I claim:

1. In a drive system for synchronously operating a plurality of motors, each provided with a stator and a rotor, an electrical power source, a first distributor motor having a stator and a rotor, a second distributor motor having a stator and a rotor, means for driving the rotors of said distributors at uniform speeds differing from one another, said means including a drive motor mechanically connected to said rotors of said distributors, a first motor to be driven at a certain speed, a second motor to be driven at a second certain speed, means for energizing the stators of said motors, the stator of said first distributor, and said drive motor from said electrical power source, means for electrically interconnecting the rotor of said first distributor motor with the rotor of said first motor and with the stator of said second distributor motor, and means for electrically connecting the rotor of said second distributor motor with the rotor of said second motor.

2. A self-synchronous motor drive system for driving a plurality of motors at different speeds, comprising an electrical power source, a motor to be driven at one certain speed, a second motor to be driven at a second certain speed, a pair of distributor motors, each of said motors having a stator and a rotor, means for mechanically interconnecting the rotors of said distributor motors so that said rotors rotate at different speeds, means for driving said rotors at uniform speeds with a constant speed ratio, means for connecting the stators of said first and second mentioned motors and the stator of said distributor to said electrical power source, means for electrically interconnecting the rotor of said distributor motor with the stator of said other distributor motor and with the rotor of said first mentioned motor to be driven at one certain speed, and means for electrically connecting the rotor of said other distributor motor with the rotor of said second mentioned motor to be driven at said second certain speed.

3. The method of operating a plurality of motors in synchronism and at different speeds, comprising mechanically driving the rotor of a distributor to generate a current of a certain frequency, mechanically driving the rotor of a second distributor at a different speed to generate a current of a different frequency, impressing said first mentioned generated current of a certain frequency on a motor for driving said motor at a certain speed and on said second mentioned distributor, impressing said second mentioned generated current of a second frequency on another motor for driving another motor at a different speed, and maintaining a fixed frequency ratio between the frequencies of said generated currents to maintain a fixed speed differential between said motors.

4. The method of synchronously operating a pair of motors at different speeds in synchronism, comprising mechanically interconnecting two sources of currents to maintain a fixed difference between the frequencies of said currents generated by said sources, electrically interconnecting said sources of currents, utilizing the current from one of said sources having one frequency for interlocking a motor thereto to run at a certain speed, and utilizing the current from the other of said sources having a different frequency for interlocking another motor to said source to run at a different speed from that of said first motor.

5. A motor drive system for a motion picture camera motor to be rotated at one certain speed and a phonograph turntable motor to be rotated at a different certain speed, comprising a pair of distributor motors, a driving motor for said distributor motors, means for energizing said driving motor, the stators of said camera motor, said turntable motor, and one of said pair of distributor motors with currents of the same frequency, means for energizing the rotor of said camera motor and the stator of said other distributor motor from the rotor of said first distributor motor, and means for energizing the rotor of said turntable motor from the rotor of said second distributor motor.

6. A motor drive system in accordance with claim 5, in which means are provided for mechanically interconnecting the rotors of said pair of distributor motors for driving said rotors at uniform different speeds.

THOMAS C. SHARP.

REFERENCES CITED

The following references are of record in the file of this patent:

UNITED STATES PATENTS

| Number | Name | Date |
|---|---|---|
| 1,757,734 | Perry | May 6, 1930 |
| 2,310,339 | Arndt | Feb. 9, 1943 |